United States Patent
Lu et al.

(10) Patent No.: US 9,319,637 B2
(45) Date of Patent: Apr. 19, 2016

(54) VEHICLE VISION SYSTEM WITH LENS POLLUTION DETECTION

(71) Applicant: MAGNA ELECTRONICS INC., Auburn Hills, MI (US)

(72) Inventors: Yuesheng Lu, Farmington Hills, MI (US); Shawn T. Hunt, Pinckney, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 326 days.

(21) Appl. No.: 13/851,378

(22) Filed: Mar. 27, 2013

(65) Prior Publication Data

US 2013/0300869 A1 Nov. 14, 2013

Related U.S. Application Data

(60) Provisional application No. 61/616,126, filed on Mar. 27, 2012.

(51) Int. Cl.
| | |
|---|---|
| *H04N 7/18* | (2006.01) |
| *B60R 1/00* | (2006.01) |
| *H04N 5/217* | (2011.01) |

(52) U.S. Cl.
CPC .. *H04N 7/18* (2013.01); *B60R 1/00* (2013.01); *H04N 5/2171* (2013.01); *B60R 2300/30* (2013.01)

(58) Field of Classification Search
CPC ........................................................ H04N 7/18
USPC ......................................................... 348/148
See application file for complete search history.

(56) References Cited

U.S. PATENT DOCUMENTS

| | | |
|---|---|---|
| 5,765,116 A | 6/1998 | Wilson-Jones et al. |
| 5,796,094 A | 8/1998 | Schofield et al. |
| 5,877,897 A | 3/1999 | Schofield et al. |
| 5,949,331 A | 9/1999 | Schofield et al. |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |

(Continued)

OTHER PUBLICATIONS

Achler et al., "Vehicle Wheel Detector using 2D Filter Banks," IEEE Intelligent Vehicles Symposium of Jun. 2004.

(Continued)

*Primary Examiner* — Gims Philippe
(74) *Attorney, Agent, or Firm* — Gardner, Linn, Burkhart & Flory, LLP (57) ABSTRACT

A vision system for a vehicle includes a camera and a processor operable to process image data captured by the camera. When the vehicle is moving, the processor at least one of (a) reads a selected set of imager register values and compare a contrast of auto exposure control zones, and wherein, responsive to a determination that a range of contrast levels is less than a threshold level, the processor determines that there are contaminants at the lens or cover of the camera, and (b) monitors outputs of photosensing elements of the camera and, when the outputs fit a Gaussian distribution, the processor classifies the photosensing elements as blocked elements and, responsive to a determination that a number of the blocked photosensing elements is greater than a threshold level, the processor determines that there are contaminants at the lens or cover of the camera.

20 Claims, 5 Drawing Sheets

(56) References Cited

U.S. PATENT DOCUMENTS

| | | | |
|---|---|---|---|
| 6,057,754 A | 5/2000 | Kinoshita et al. |
| 6,291,906 B1 | 9/2001 | Marcus et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,315,421 B1 | 11/2001 | Apfelbeck et al. |
| 6,317,057 B1 | 11/2001 | Lee |
| 6,320,176 B1 | 11/2001 | Schofield et al. |
| 6,320,282 B1 | 11/2001 | Caldwell |
| 6,324,450 B1 | 11/2001 | Iwama |
| 6,333,759 B1 | 12/2001 | Mazzilli |
| 6,341,523 B2 | 1/2002 | Lynam |
| 6,353,392 B1 | 3/2002 | Schofield et al. |
| 6,362,729 B1 | 3/2002 | Hellmann et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham |
| 6,411,204 B1 | 6/2002 | Bloomfield et al. |
| 6,411,328 B1 | 6/2002 | Franke et al. |
| 6,424,273 B1 | 7/2002 | Gutta et al. |
| 6,429,594 B1 | 8/2002 | Stam et al. |
| 6,430,303 B1 | 8/2002 | Naoi et al. |
| 6,433,817 B1 | 8/2002 | Guerra |
| 6,441,748 B1 | 8/2002 | Takagi et al. |
| 6,442,465 B2 | 8/2002 | Breed et al. |
| 6,469,739 B1 | 10/2002 | Bechtel et al. |
| 6,497,503 B1 | 12/2002 | Dassanayake et al. |
| 6,516,272 B2 | 2/2003 | Lin |
| 6,516,664 B2 | 2/2003 | Lynam |
| 6,523,964 B2 | 2/2003 | Schofield et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,698 B2 | 7/2003 | Stam et al. |
| 6,594,583 B2 | 7/2003 | Ogura et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,680,792 B2 | 1/2004 | Miles |
| 6,681,163 B2 | 1/2004 | Stam et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,728,393 B2 | 4/2004 | Stam et al. |
| 6,728,623 B2 | 4/2004 | Takenaga et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,764,210 B2 | 7/2004 | Akiyama |
| 6,765,480 B2 | 7/2004 | Tseng |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa |
| 6,801,244 B2 | 10/2004 | Takeda et al. |
| 6,802,617 B2 | 10/2004 | Schofield et al. |
| 6,807,287 B1 | 10/2004 | Hermans |
| 6,812,463 B2 | 11/2004 | Okada |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,838,980 B2 | 1/2005 | Gloger et al. |
| 6,842,189 B2 | 1/2005 | Park |
| 6,853,897 B2 | 2/2005 | Stam et al. |
| 6,859,148 B2 | 2/2005 | Miller et al. |
| 6,861,809 B2 | 3/2005 | Stam |
| 6,873,253 B2 | 3/2005 | Veziris |
| 6,882,287 B2 | 4/2005 | Schofield |
| 6,888,447 B2 | 5/2005 | Hori et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,959,994 B2 | 11/2005 | Fujikawa et al. |
| 6,961,178 B2 | 11/2005 | Sugino et al. |
| 6,967,569 B2 | 11/2005 | Weber et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,023,331 B2 | 4/2006 | Kodama |
| 7,030,738 B2 | 4/2006 | Ishii |
| 7,030,775 B2 | 4/2006 | Sekiguchi |
| 7,038,577 B2 | 5/2006 | Pawlicki et al. |
| 7,057,505 B2 | 6/2006 | Iwamoto |
| 7,057,681 B2 | 6/2006 | Hinata et al. |
| 7,062,300 B1 | 6/2006 | Kim |
| 7,065,432 B2 | 6/2006 | Moisel et al. |
| 7,068,289 B2 | 6/2006 | Satoh et al. |
| 7,085,633 B2 | 8/2006 | Nishira et al. |
| 7,085,637 B2 | 8/2006 | Breed et al. |
| 7,092,548 B2 | 8/2006 | Laumeyer et al. |
| 7,095,432 B2 | 8/2006 | Nakayama et al. |
| 7,106,213 B2 | 9/2006 | White |
| 7,110,021 B2 | 9/2006 | Nobori et al. |
| 7,113,867 B1 | 9/2006 | Stein |
| 7,116,246 B2 | 10/2006 | Winter et al. |
| 7,121,028 B2 | 10/2006 | Shoen et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,187,498 B2 | 3/2007 | Bengoechea et al. |
| 7,195,381 B2 | 3/2007 | Lynam et al. |
| 7,196,305 B2 | 3/2007 | Shaffer et al. |
| 7,205,904 B2 | 4/2007 | Schofield |
| 7,227,459 B2 | 6/2007 | Bos et al. |
| 7,227,611 B2 | 6/2007 | Hull et al. |
| 7,235,918 B2 | 6/2007 | McCullough et al. |
| 7,248,283 B2 | 7/2007 | Takagi et al. |
| 7,271,951 B2 | 9/2007 | Weber et al. |
| 7,304,661 B2 | 12/2007 | Ishikura |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,337,055 B2 | 2/2008 | Matsumoto et al. |
| 7,338,177 B2 | 3/2008 | Lynam |
| 7,355,524 B2 | 4/2008 | Schofield |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,420,756 B2 | 9/2008 | Lynam |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,429,998 B2 | 9/2008 | Kawauchi et al. |
| 7,432,967 B2 | 10/2008 | Bechtel et al. |
| 7,446,924 B2 | 11/2008 | Schofield et al. |
| 7,460,007 B2 | 12/2008 | Schofield et al. |
| 7,474,963 B2 | 1/2009 | Taylor et al. |
| 7,489,374 B2 | 2/2009 | Utsumi et al. |
| 7,495,719 B2 | 2/2009 | Adachi et al. |

(56) References Cited

U.S. PATENT DOCUMENTS

| | | |
|---|---|---|
| 7,525,604 B2 | 4/2009 | Xue |
| 7,526,103 B2 | 4/2009 | Schofield et al. |
| 7,541,743 B2 | 6/2009 | Salmeen et al. |
| 7,543,946 B2 | 6/2009 | Ockerse et al. |
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,566,851 B2 | 7/2009 | Stein et al. |
| 7,567,291 B2 | 7/2009 | Bechtel et al. |
| 7,605,856 B2 | 10/2009 | Imoto |
| 7,609,857 B2 | 10/2009 | Franz |
| 7,613,327 B2 | 11/2009 | Stam et al. |
| 7,616,781 B2 | 11/2009 | Schofield et al. |
| 7,619,508 B2 | 11/2009 | Lynam et al. |
| 7,629,996 B2 | 12/2009 | Rademacher et al. |
| 7,639,149 B2 | 12/2009 | Katoh |
| 7,653,215 B2 | 1/2010 | Stam |
| 7,663,798 B2 | 2/2010 | Tonar et al. |
| 7,676,087 B2 | 3/2010 | Dhua et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,786,898 B2 | 8/2010 | Stein et al. |
| 7,791,694 B2 | 9/2010 | Molsen et al. |
| 7,792,329 B2 | 9/2010 | Schofield et al. |
| 7,842,154 B2 | 11/2010 | Lynam |
| 7,843,451 B2 | 11/2010 | Lafon |
| 7,854,514 B2 | 12/2010 | Conner et al. |
| 7,855,778 B2 | 12/2010 | Yung et al. |
| 7,859,565 B2 | 12/2010 | Schofield et al. |
| 7,881,496 B2 | 2/2011 | Camilleri |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,930,160 B1 | 4/2011 | Hosagrahara et al. |
| 7,949,152 B2 | 5/2011 | Schofield et al. |
| 7,965,357 B2 | 6/2011 | Van De Witte et al. |
| 7,994,462 B2 | 8/2011 | Schofield et al. |
| 8,017,898 B2 | 9/2011 | Lu et al. |
| 8,027,691 B2 | 9/2011 | Bernas et al. |
| 8,064,643 B2 | 11/2011 | Stein et al. |
| 8,082,101 B2 | 12/2011 | Stein et al. |
| 8,090,153 B2 | 1/2012 | Schofield et al. |
| 8,095,310 B2 | 1/2012 | Taylor et al. |
| 8,098,142 B2 | 1/2012 | Schofield et al. |
| 8,120,652 B2 | 2/2012 | Bechtel et al. |
| 8,164,628 B2 | 4/2012 | Stein et al. |
| 8,184,159 B2 | 5/2012 | Luo |
| 8,203,440 B2 | 6/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,289,430 B2 | 10/2012 | Bechtel et al. |
| 8,305,471 B2 | 11/2012 | Bechtel et al. |
| 8,308,325 B2 | 11/2012 | Takayanazi et al. |
| 8,314,689 B2 | 11/2012 | Schofield et al. |
| 8,339,526 B2 | 12/2012 | Minikey, Jr. et al. |
| 8,378,851 B2 | 2/2013 | Stein et al. |
| 8,405,726 B2 | 3/2013 | Schofield et al. |
| 8,452,055 B2 | 5/2013 | Stein et al. |
| 8,553,088 B2 | 10/2013 | Stein et al. |
| 2005/0174567 A1* | 8/2005 | Hanna ................. 356/237.1 |
| 2007/0115357 A1 | 5/2007 | Stein et al. |
| 2007/0182528 A1 | 8/2007 | Breed et al. |
| 2009/0278950 A1* | 11/2009 | Deng et al. ............ 348/222.1 |
| 2012/0162427 A1* | 6/2012 | Lynam ..................... 348/148 |

OTHER PUBLICATIONS

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Kastrinaki et al., "A survey of video processing techniques for traffic applications".

Sun et al., "On-road vehicle detection using optical sensors: a review".

* cited by examiner

FIG. 1

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 2

| STAT_AE_BRIGHTNESS_0_0 | STAT_AE_BRIGHTNESS_0_1 | STAT_AE_BRIGHTNESS_0_2 | STAT_AE_BRIGHTNESS_0_3 | STAT_AE_BRIGHTNESS_0_4 |
|---|---|---|---|---|
| STAT_AE_BRIGHTNESS_1_0 | STAT_AE_BRIGHTNESS_1_1 | STAT_AE_BRIGHTNESS_1_2 | STAT_AE_BRIGHTNESS_1_3 | STAT_AE_BRIGHTNESS_1_4 |
| STAT_AE_BRIGHTNESS_2_0 | STAT_AE_BRIGHTNESS_2_1 | STAT_AE_BRIGHTNESS_2_2 | STAT_AE_BRIGHTNESS_2_3 | STAT_AE_BRIGHTNESS_2_4 |
| STAT_AE_BRIGHTNESS_3_0 | STAT_AE_BRIGHTNESS_3_1 | STAT_AE_BRIGHTNESS_3_2 | STAT_AE_BRIGHTNESS_3_3 | STAT_AE_BRIGHTNESS_3_4 |
| STAT_AE_BRIGHTNESS_4_0 | STAT_AE_BRIGHTNESS_4_1 | STAT_AE_BRIGHTNESS_4_2 | STAT_AE_BRIGHTNESS_4_3 | STAT_AE_BRIGHTNESS_4_4 |

VEHICLE VISION SYSTEM WITH LENS POLLUTION DETECTION

CROSS REFERENCE TO RELATED APPLICATION

The present invention claims the filing benefit of U.S. provisional application Ser. No. 61/616,126, filed Mar. 27, 2012, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system is operable detect pollution or contaminants, such as water, mud, salt and/or the like, that is/are disposed at the lens or cover of the camera, and may generate an alert or may operate to clean or wipe the lens or cover in response to detection of a threshold degree of pollution or contaminants at or on the lens or cover.

According to an aspect of the present invention, a vision system for a vehicle includes at least one camera or image sensor disposed at a vehicle and having a field of view exterior of the vehicle, and a processor operable to process data transmitted by the camera. The vision system may be operable to compare contrast ratios of outputs of photosensing elements or pixels of the pixelated imaging array of the camera or imager to determine if some of the pixels are blocked by contaminants or the like at the lens of the camera, and/or the vision system may be operable to monitor pixels of the pixelated imaging array and, when the pixels fit a Gaussian distribution, the processor or system may classify the pixels as blocked pixels and, responsive to a determination that a number of blocked pixels is greater than a threshold level, the processor determines that there are contaminants at the lens of the camera. Responsive to the processor determining that there are contaminants at the lens of the camera, the system may generate an alert and/or adapt processing of image data to at least partially accommodate for the presence of the determined contaminants and/or clean the lens. The processor or algorithm may be incorporated in circuitry of the camera, or the processor or algorithm may be incorporated in circuitry of a control of the vehicle or a control of the vision system that is separate from the camera and camera circuitry.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from one or more cameras and may provide a displayed image that is representative of the subject vehicle (such as for a top down or bird's eye or surround view, such as discussed below).

Figure 1:
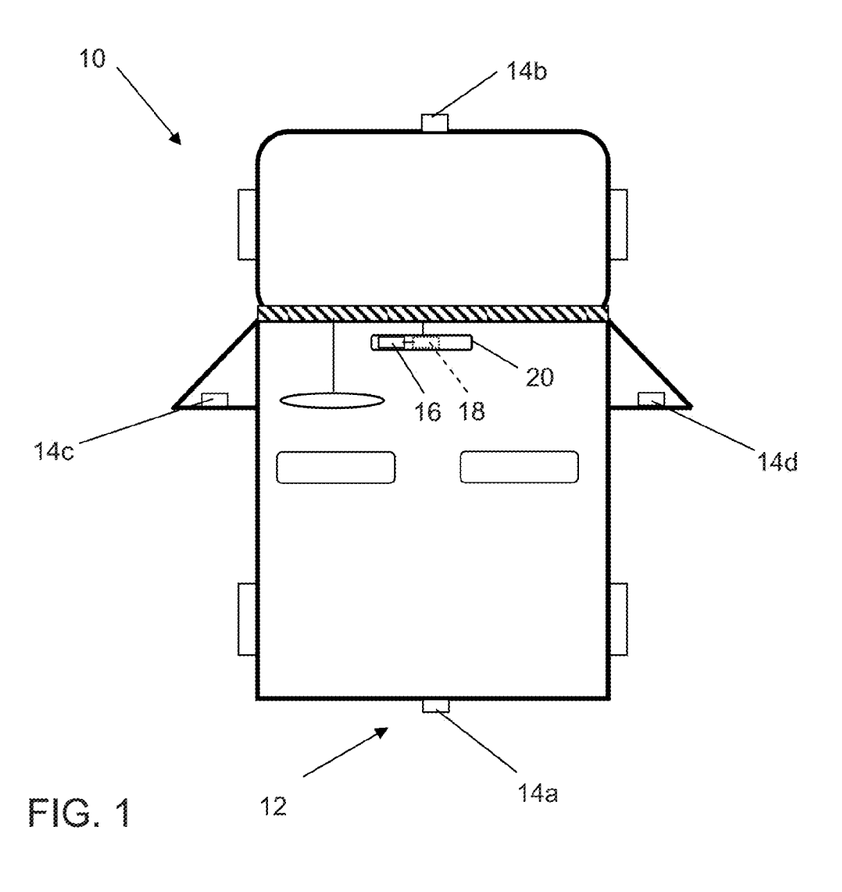
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

The present invention provides algorithms that are used in vision systems and/or automotive cameras to identify and detect the degree that a lens on a camera is polluted by water droplets, mud or salt, so as to determine when the pollution is to a degree that the camera's performance may be substantially or severely reduced, and in automotive camera applications, when the driver's ability to use or view the camera's video is impaired or when the machine vision processor's performance is substantially or significantly impaired. It is desired that, in any of the described scenarios, the algorithms will determine the degree of pollution and give out warning signals, messages or directly control certain mechanisms to clean the lens of the camera. The present invention provides two pollution detection algorithms, where the first algorithm (which uses or requires a reduced amount of processing power) may be implemented directly in a camera and the second algorithm (which uses or requires more processing power) may be implemented in a control or electronic control unit (ECU) of the vehicle or a control of the vision system that may be separate and remote from the camera and/or camera circuitry.

Due to the minimum processing power and data bandwidth of an automotive rear view camera, it is not readily feasible to use image processing software on the microprocessor to identify the pollution, because such processing usually demands a high amount of processing power. The present invention thus provides a method for detecting pollution by reading a limited number of imager register values. The algorithm detects pollution by checking the contrast of auto exposure (AE) control zones when an AE function or feature is enabled and the camera's host vehicle is traveling in a forward or rearward direction or driving condition. Normally, in a typical camera imager (such as a two dimensional array of photosensing elements or pixels) used in automotive camera applications, the sensing area of the imager is divided into multiple zones (such as, for example, 5×5 zones or other sized zones) that allows each zone's pixels to be averaged in brightness and color values. The camera's or imager's auto exposure and auto white balance can be controlled by reading the zone brightness and color values of all zones. This first algorithm is based on the arithmetic calculations of the brightness values of all zones.

Figure 2:
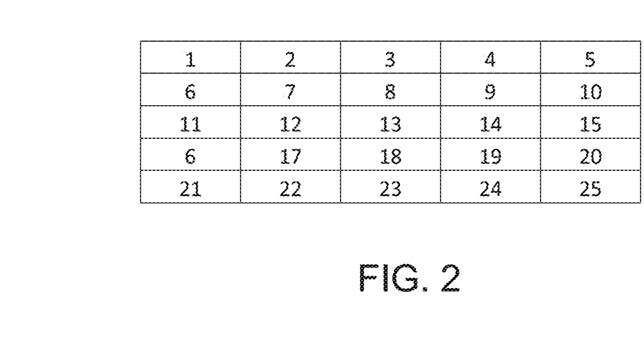
FIG. 2 is a table of auto exposure (AE) zone labels for an exemplary imager for a vehicle vision system.
Figure 3:
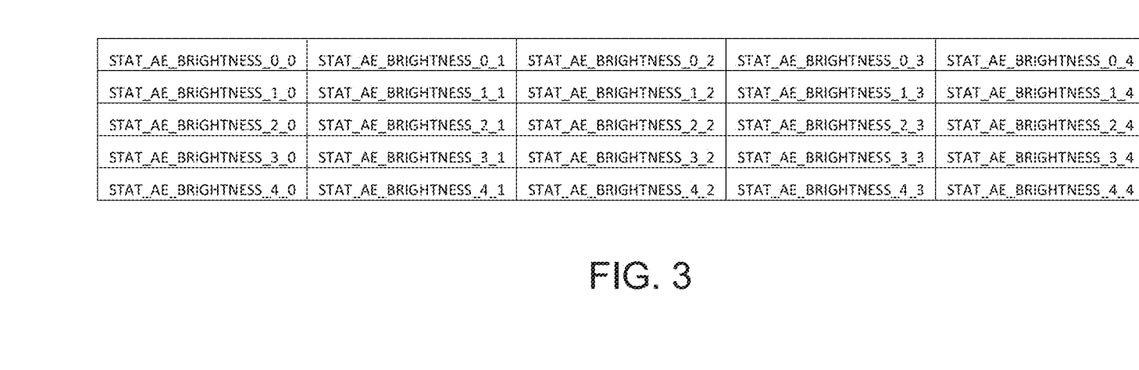
FIG. 3 is a table of AE zone brightness registers for an exemplary imager.

Tests on different roads at different times show that the contrast of AE zones has a large range (0-1) for a clean lens with little or no pollution and a small range (0-0.3) for a moderately polluted lens. To reliably detect the pollution on the lens, multiple AE zone contrasts (such as 10 used for the illustrated embodiment) are checked. Those AE zone contrasts includes the contrasts of the following AE zone pairs, 1-11, 2-12, 3-13, 4-14, 5-15, 6-16, 7-17, 8-18, 9-19, 10-20. The AE zone labels are shown in FIG. 2. As an example, in an Aptina CMOS imager MT9V128 (which is a CMOS imager with VGA resolution), the registers for corresponding AE zone brightness are listed in FIG. 3.

The basic concept of the first algorithm is as follows. In a typical automotive rear view camera, the scene imaged by the imager typically has the sky (above the horizon) imaged in the first or upper rows and the vehicle bumper in the last or lower row or rows, counting from top to bottom of the captured image. The middle rows of zones mostly image or show the road, ground, buildings, parked or passing vehicles and other objects. When the camera's host vehicle drives forward (or rearward) on the road, the zones in the middle rows will experience more changes of averaged brightness values of the zones than the ones in the top and bottom rows. By calculating the difference or contrast of the brightness values between the middle zones and zones in the top or bottom rows, either in the same column or the different column, the system can determine if a normal view is blocked or partially blocked, or polluted, by the substances (such as dirt, debris, moisture or the like) on the lens. In the case of a lens that is partially blocked, the contrast will be lower than the contrast of the same or similar zones with a clean lens. This is because when a part of camera lens is blocked by some substances (such as, for example, water droplets, salt, mud and/or the like), some light rays are blocked and cannot reach the imager as they normally do. As a result, some areas of the imager appear darker or have lower brightness values, and the contrast of the scene in these areas become lower.

Furthermore, when the vehicle moves along the road, the moving scene imaged by the imager generates less pixel value fluctuation or variation when the lens is polluted. The amount of reduced pixel value fluctuation grows with the amount of pollution on lens. In principle, one can compute the above values at every pixel of the imager, but doing so requires a significant amount of processing power and data transfer bandwidth. Instead, the system or process of the present invention uses the imager's existing average pixel brightness values of AE zones to compute the pollution level at the lens. This requires a reduced or minimum amount of computing power and data traffic. A microprocessor with limited processing power and with an 12C or SPI communication channel with the imager, which is typical for a rear view camera of a vehicle, is adequate for running the algorithm. The algorithm can also be built into the imager's system-on-chip (SOC) part to perform the above algorithm without using an external microprocessor.

Furthermore, the same algorithm can also be implemented in a separate processor that can calculate pollution level based only on the video input from a separate camera. In such a configuration or implementation, the computation can be based on pixel brightness or zone brightness average.

Figure 4:
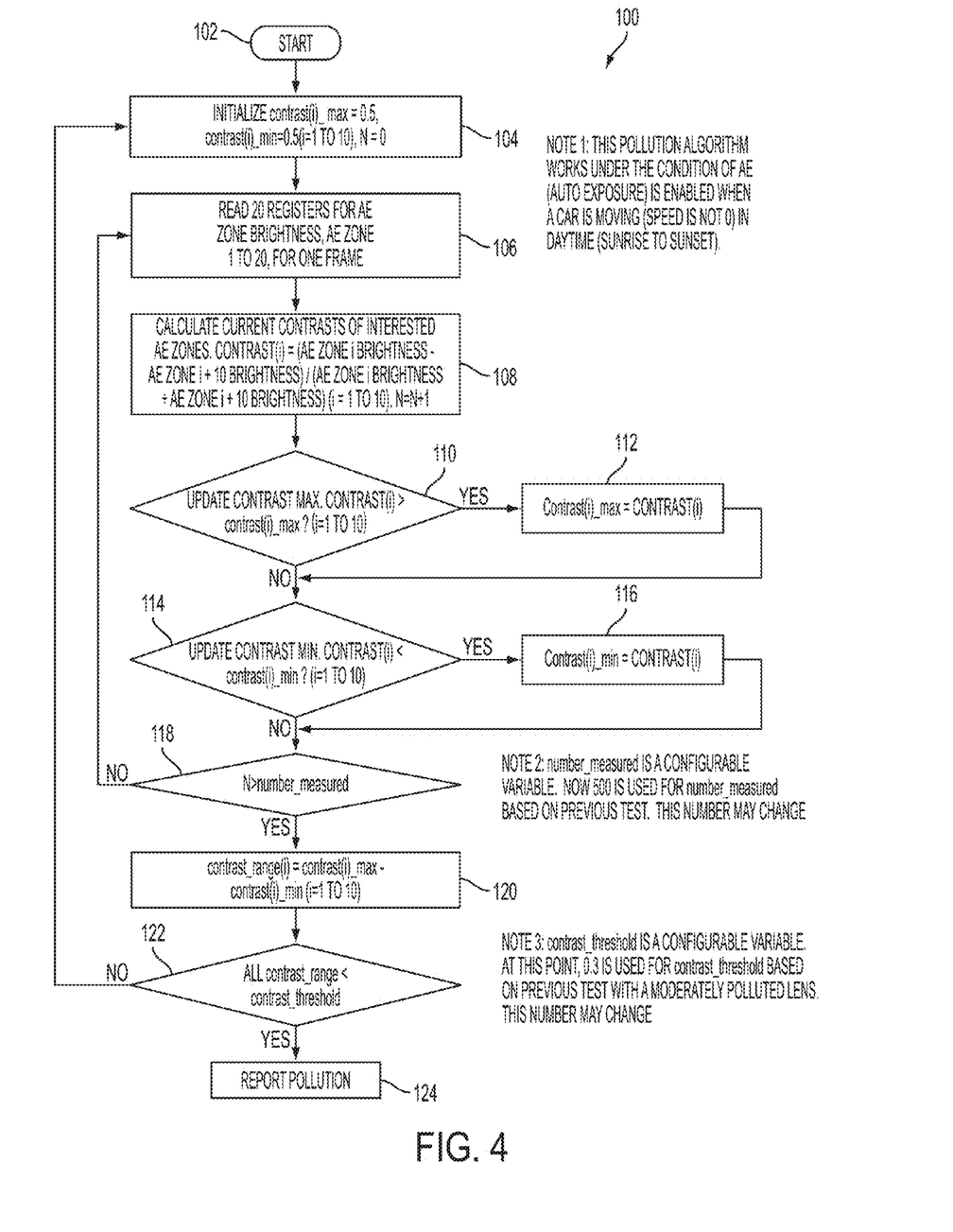
FIG. 4 is a flow chart of a pollution detection algorithm of the present invention.

A flow chart of the pollution detection algorithm or process 110 is shown in FIG. 4. The process 110 starts at 102, and initializes a contrast maximum or max value and a contrast minimum or min value at 104. The process reads the registers for AE zone brightness for one frame at 106 (such as by reading AE zones 1-20), and calculates the current contrasts of interested AE zones at 108. If the system determines at 110 that the calculated contrast is greater than the contrast max value, then the contrast max value is set to the current contrast value at 112 and then the process continues to 114. However, if the system determines at 110 that the calculated contrast is not greater than the contrast max, then the process continues to 114. If the system determines at 114 that the calculated contrast is less than the contrast min value, then the contrast min value is set to the current contrast value at 116 and then the process continues to 118. However, if the system determines at 114 that the calculated contrast is not less than the contrast min value, then the process continues to 118. If the system has not completed the N iterations at 118, then the system returns to 106 and continues. If the system has completed the N iterations at 118, then the contrast range is set to be the difference between the contrast max and contrast min values at 120. If the system determines at 122 that the contrast range is less than a contrast threshold, then the system determines that there is pollution present at the lens (such as a threshold degree of pollution), and the system may generate an alert or report to report the pollution at 124 (such as providing a visual or audible report or alert to the driver of the vehicle). If the system determines at 122 that the contrast range is not less than a contrast threshold, then the system determines that there is no pollution (or there is less than a threshold amount of pollution) present at the lens and returns to 104 and repeats the process. Optionally, the system, responsive to a determination of pollution at the lens, may generate an alert or report and/or adapt the processing of image data to at least partially accommodate for the presence of the determined contaminants at the camera lens and/or clean the lens (such as via a fluid spray or wiping system or the like).

The second algorithm of the present invention preferably is implemented to run in a vehicle controller or control unit or ECU. Each pixel in the image is modeled as several Gaussians distributions. The system requires an initial training period (such as, for example, about 30 frames, or approximately 1 second of video) along with the scene changing (movement of the vehicle) in order to operate. If the vehicle remains stationary and the algorithm continued to run, all pixels would be flagged as not changing.

Figure 5:
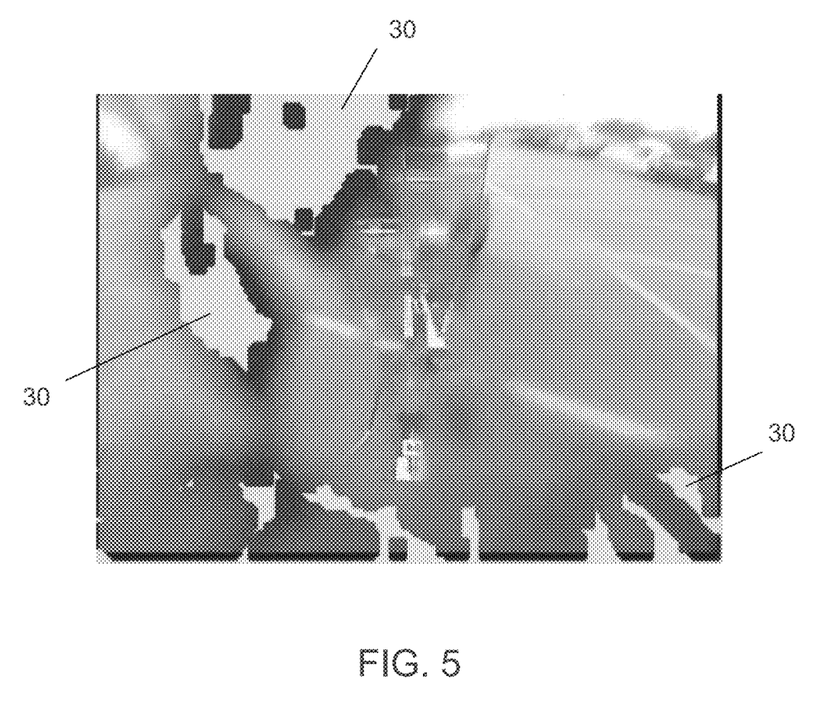
FIG. 5 is an image captured by an imager showing an exemplary scene as processed by a pollution detection algorithm of the present invention.

At each frame, the algorithm computes whether the pixel value remained static (the pixel value fit one of the Gaussian distributions) or the pixel value changed (the pixel value did not fit one of the Gaussian distributions). The Gaussian mixture model was chosen because it is robust to various lighting conditions, which leads to fewer numbers of false positives. When the number of pixels that have been classified as "not changing" exceeds a threshold (such as, for example, about 30 percent of the image or any suitable or selected percentage of the image), a blockage condition is identified. FIG. 5 depicts an example scene with this algorithm running, where the solid pixels or pixel areas 30 are representative of pixels that have not had any change.

Figure 6:
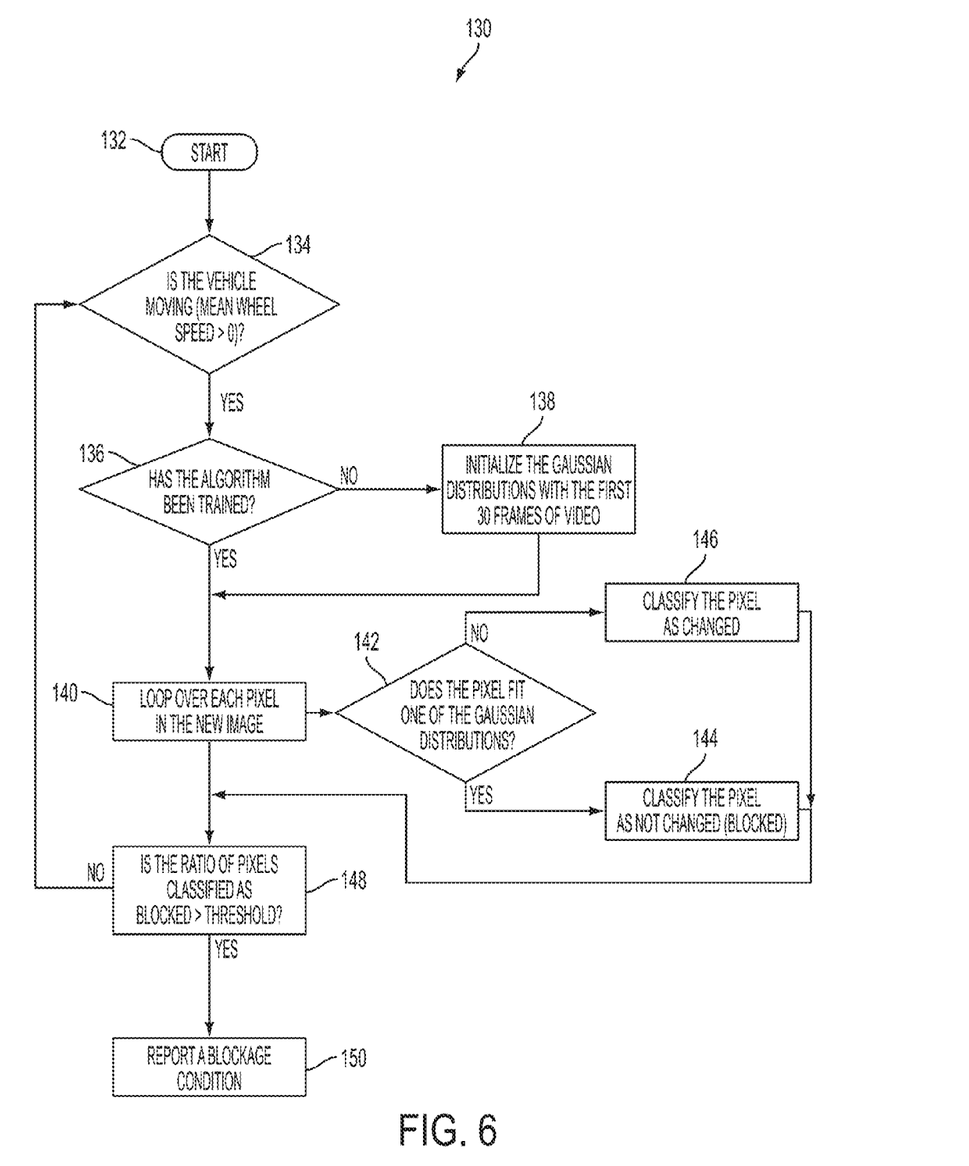
FIG. 6 is a flow chart of an ECU-based algorithm of the present invention.

FIG. 6 shows the flow chart of the second algorithm or ECU-based algorithm. The second algorithm or process 130 starts at 132 and, if the system determines at 134 that the vehicle is moving faster than a threshold level, then the system determines, at 136, whether or not the algorithm has been trained. If the system determines that the vehicle is not moving, then the process does not continue. If the vehicle is moving, but the algorithm has not been trained, then the system initializes the Gaussian distributions with the first 30 frames (or other suitable number of frames) of video images at 138 and then continues to 140, where the algorithm loops over each pixel in the new image. At 142, the system determines if the pixel fits one of the Gaussian distributions, and if so, it classifies the pixel as not changed or blocked at 144, and if not, the system classifies the pixel as changed at 146. The process then continues at 148, where the system determines whether or not the ratio of pixels classified as blocked is greater than a threshold level. If the ratio is greater than the threshold level, the system reports a blockage condition at 160. If the ratio is not greater than the threshold level, the system returns to 134 and continues.

Therefore, the present invention provides a vision system for a vehicle that includes a processor or head unit and a camera or cameras mounted at the vehicle. The system or process is operable to determine if there is pollution or dirt or contaminants present at a lens or cover of an exterior camera of a vehicle vision system (or an interiorly disposed camera that views through a cover or lens that may be exposed at the exterior of the vehicle). The system or process or algorithm may be incorporated in the circuitry of the camera or may be incorporated in a vehicle-based control or control of the vehicle or vision system. Optionally, a system or algorithm of the present invention (that may be operated or processed by the circuitry of the imager or camera) may be operable to read a limited number of imager register values, and may detect pollution by checking the contrast of auto exposure (AE) control zones when an AE function or feature is enabled and the camera's host vehicle is traveling in a forward (or rearward) direction or driving condition. When the range of contrast levels of the pixels are less than a threshold level, such that the contrast levels are not changing a threshold amount as the vehicle is moved, then the system or process or algorithm may determine that there is pollution or contaminants at the lens or cover of the imager.

Optionally, a system or algorithm of the present invention (that may be incorporated in or operated by a control of the vehicle or of the vehicle vision system and separate from the circuitry of the imager or camera) may be operable to process or monitor each pixel (or a substantial number of pixels) of an imager and if the pixel(s) fits a Gaussian distribution (that is based on a number of frames of the video images), the process or algorithm may classify the pixel as not changed or blocked, and then the system determines whether or not the ratio of pixels classified as blocked is greater than a threshold level, and if so, the system may determine a blockage condition.

Based on a result or output of either algorithm, the system may generate an alert to the driver of a blockage condition, or may clean the cover or lens (such as by utilizing aspects of the vision systems and cameras described in U.S. Pat. No. 7,965, 336, which is hereby incorporated herein by reference in its entirety). Optionally, the system may, responsive to detection of or a determination of the presence of dirt or contaminants at the lens, adjust the processing of image data captured by that camera to accommodate or account for the determined dirt or contaminants that are present at the lens. Optionally, the system may utilize aspects of the dirt detection and camera protection systems described in U.S. provisional applications Ser. No. 61/713,772, filed Oct. 15, 2012; Ser. No. 61/766,883, filed Feb. 20, 2013; and/or Ser. No. 61/804,786, filed Mar. 25, 2013, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array and optionally a mega-pixel array that provides high definition imaging), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005, 974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/ or 5,786,772, and/or PCT Application No. PCT/US2010/ 047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and/or PCT Application No. PCT/US2012/048110, filed Jul. 25, 2012, and/or PCT Application No. PCT/CA2012/000378, filed Apr. 25, 2012, and/or PCT Application No. PCT/US2012/056014, filed Sep. 19, 2012, and/or PCT Application No. PCT/US12/57007, filed Sep. 25, 2012, and/or PCT Application No. PCT/US2012/061548, filed Oct. 24, 2012, and/or PCT Application No. PCT/US2012/062906, filed Nov. 1, 2012, and/or PCT Application No. PCT/US2012/063520, filed Nov. 5, 2012, and/or PCT Application No. PCT/US2012/064980, filed Nov. 14, 2012, and/or PCT Application No. PCT/US2012/066570, filed Nov. 27, 2012, and/or PCT Application No. PCT/US2012/066571, filed Nov. 27, 2012, and/or PCT Application No. PCT/US2012/068331, filed Dec. 7, 2012, and/or PCT Application No. PCT/US2013/022119, filed Jan. 18, 2013, , and/or PCT Application No. PCT/US2013/027342, filed Feb. 22, 2013, and/or U.S. patent application Ser. No. 13/848,796, filed Mar. 22, 2013; Ser. No. 13/847,815, filed Mar. 20, 2013; Ser. No. 13/779,881, filed Feb. 28, 2013; Ser. No. 13/785,099, filed Mar. 5, 2013; Ser. No. 13/774,317, filed Feb. 22, 2013; Ser. No. 13/774,315, filed Feb. 22, 2013; Ser. No. 13/681,963, filed Nov. 20, 201;2 Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications Ser. No. 61/733,598, filed Dec. 5, 2012; Ser. No. 61/733,093, filed Dec. 4, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; and/or Ser. No. 61/624,507, filed Apr. 16, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, (which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or PCT Application No. PCT/US2012/066571, filed Nov. 27, 2012, and/or PCT Application No. PCT/US2012/068331, filed Dec. 7, 2012, and/or PCT Application No. PCT/US2013/022119, filed Jan. 18, 2013, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
    a camera disposed at a vehicle and having a field of view exterior of the vehicle;

wherein said camera comprises a lens and an imaging array comprising an array of photosensing elements;

a processor operable to process image data captured by said camera;

wherein, when the vehicle is moving in a forward or rearward direction, said processor is operable to at least one of (a) read a selected set of imager register values and compare a contrast of auto exposure control zones, and wherein, responsive to a determination that a range of contrast levels is less than a threshold level, said processor determines that there are contaminants at said lens of said camera, and (b) monitor outputs of photosensing elements of said imaging array and wherein, when said photosensing element outputs fit a Gaussian distribution, said processor classifies said photosensing elements as blocked photosensing elements and, responsive to a determination that a number of said blocked photosensing elements is greater than a threshold level, said processor determines that there are contaminants at said lens of said camera; and wherein, when said processor determines that there are contaminants at said lens of said camera, said system at least one of (i) generates an alert, (ii) adapts processing of image data to at least partially accommodate for the presence of the determined contaminants and (iii) cleans said lens.

2. The vision system of claim 1, wherein said processor is incorporated in circuitry of said camera.

3. The vision system of claim 1, wherein said processor is incorporated in circuitry of a control of the vehicle.

4. The vision system of claim 1, wherein said processor is operable to read a selected set of imager register values and compare a contrast of auto exposure control zones, and wherein, responsive to a determination that a range of contrast levels is less than a threshold level, said processor determines that there are contaminants at said lens of said camera.

5. The vision system of claim 4, wherein said processor is operable to compare a contrast of auto exposure control zones when an auto exposure function of said camera is enabled.

6. The vision system of claim 4, wherein said processor compares contrast levels between a generally middle zone of said captured image data and a zone at an upper or lower region of said captured image data.

7. The vision system of claim 4, wherein said processor is incorporated in circuitry of said camera.

8. The vision system of claim 1, wherein said processor is operable to monitor outputs of photosensing elements of said imaging array and, when said photosensing element outputs fit a Gaussian distribution, said processor classifies said photosensing elements as blocked photosensing elements and, responsive to a determination that a number of said blocked photosensing elements is greater than a threshold level, said processor determines that there are contaminants at said lens of said camera.

9. The vision system of claim 8, wherein said Gaussian distribution is based on a selected number of initial frames of said captured image data.

10. The vision system of claim 8, wherein said processor is incorporated in circuitry of a control of the vehicle.

11. A vision system for a vehicle, said vision system comprising:

a camera disposed at a vehicle and having a field of view exterior of the vehicle;

wherein said camera comprises a lens and an imaging array comprising an array of photosensing elements;

a processor operable to process image data captured by said camera;

wherein said processor is one of (i) incorporated in circuitry of said camera and (ii) incorporated in circuitry of a control of the vehicle;

wherein, when the vehicle is moving in a forward or rearward direction, said processor is operable to read a selected set of imager register values and compare contrast levels of auto exposure control zones, and wherein, responsive to a determination that a range of contrast levels is less than a threshold level, said processor determines that there are contaminants at said lens of said camera; and wherein, when said processor determines that there are contaminants at said lens of said camera, said system at least one of (i) generates an alert, (ii) adapts processing of image data to at least partially accommodate for the presence of the determined contaminants and (iii) cleans said lens.

12. The vision system of claim 11, wherein said processor is operable to compare a contrast of auto exposure control zones when an auto exposure function of said camera is enabled.

13. The vision system of claim 12, wherein said processor compares contrast levels between a generally middle zone of said captured image data and a zone at an upper or lower region of said captured image data.

14. The vision system of claim 13, wherein said processor is incorporated in circuitry of said camera.

15. The vision system of claim 11, wherein said processor compares contrast levels of auto exposure control zones when an auto exposure function is enabled and the equipped vehicle is moving in a forward or rearward direction to determine a determined range of contrast levels of said photosensing element outputs for at least one auto exposure control zone, and wherein, when the determined range of contrast levels of the photosensing element outputs is less than a threshold level, said processor determines that there are contaminants at said lens of said camera.

16. The vision system of claim 15, wherein said at least one auto exposure control zone comprises a zone that is representative of a generally middle zone of captured image data that is between an upper region of captured image data and a lower region of captured image data.

17. A vision system for a vehicle, said vision system comprising:

a camera disposed at a vehicle and having a field of view exterior of the vehicle;

wherein said camera comprises a lens and an imaging array comprising an array of photosensing elements;

a processor operable to process image data captured by said camera;

wherein said processor is one of (i) incorporated in circuitry of said camera and (ii) incorporated in circuitry of a control of the vehicle;

wherein, when the vehicle is moving in a forward or rearward direction, said processor is operable to monitor outputs of photosensing elements of said imaging array and wherein, when said photosensing element outputs fit a Gaussian distribution, said processor classifies said photosensing elements as blocked photosensing elements and, responsive to a determination that a number of said blocked photosensing elements is greater than a threshold level, said processor determines that there are contaminants at said lens of said camera; and wherein, when said processor determines that there are contaminants at said lens of said camera, said system at least one of (i) generates an alert, (ii) adapts processing of image data to at least partially accommodate for the presence of the determined contaminants and (iii) cleans said lens.

18. The vision system of claim 17, wherein said Gaussian distribution is based on a plurality of frames of captured image data.

19. The vision system of claim 17, wherein said Gaussian distribution is based on a selected number of initial frames of captured image data.

20. The vision system of claim 19, wherein said processor is incorporated in circuitry of a control of the vehicle.

* * * * *